US008185268B2

(12) United States Patent  
Jarvinen et al.

(10) Patent No.: US 8,185,268 B2
(45) Date of Patent: May 22, 2012

(54) USER INTERFACE FOR A VEHICLE INSTALLED COMMUNICATION DEVICE

(75) Inventors: Jari P. Jarvinen, Coral Springs, FL (US); Shirish M. Kaner, Nagpur (IN); Mark T. Palmer, Coral Springs, FL (US)

(73) Assignee: Motorola Solutions, Inc., Schaumburg, IL (US)

( * ) Notice: Subject to any disclaimer, the term of this patent is extended or adjusted under 35 U.S.C. 154(b) by 508 days.

(21) Appl. No.: 12/271,873

(22) Filed: Nov. 15, 2008

(65) Prior Publication Data

US 2010/0125393 A1 May 20, 2010

(51) Int. Cl.
G06F 7/00 (2006.01)

(52) U.S. Cl. ......... 701/36; 701/1; 701/2; 701/3; 701/14; 701/23; 455/12.1; 455/13.4; 340/850; 340/945; 340/988; 359/202.1; 359/900; 370/316; 60/291

(58) Field of Classification Search ............... 701/1, 2, 701/3, 14, 23, 24, 29, 36, 213, 214; 244/2, 244/63, 169, 158.1, 171.1, 173.3; 455/12.1, 455/13.4, 427, 428, 455; 340/850, 945, 988; 359/202.1, 900; 370/316; 60/39, 291
See application file for complete search history.

(56) References Cited

U.S. PATENT DOCUMENTS

| 4,471,165 | A | 9/1984 | Defino et al. |
| 6,032,054 | A | 2/2000 | Schwinke |
| D421,975 | S | 3/2000 | Steel |
| D445,049 | S | 7/2001 | Lee |
| D481,706 | S | 11/2003 | Boothroyd et al. |
| D495,981 | S | 9/2004 | Tolle et al. |
| 6,928,350 | B2 | 8/2005 | Melnyk et al. |
| D539,676 | S | 4/2007 | Hedderich et al. |
| 7,474,204 | B2 * | 1/2009 | Songwe ............... 340/461 |
| 2006/0286944 | A1 * | 12/2006 | Songwe ............... 455/99 |
| 2007/0000346 | A1 * | 1/2007 | Songwe ............... 74/552 |
| 2007/0195939 | A1 * | 8/2007 | Sink et al. ............ 379/37 |
| 2008/0211779 | A1 | 9/2008 | Pryor |
| 2008/0266265 | A1 * | 10/2008 | Quigley et al. ....... 345/173 |

FOREIGN PATENT DOCUMENTS

WO 2004079934 A1 9/2004

OTHER PUBLICATIONS

"Technology That's Second Nature" Aug. 4, 2008.

(Continued)

*Primary Examiner* — James Trammell
*Assistant Examiner* — McDieunel Marc
(74) *Attorney, Agent, or Firm* — Barbara R. Doutre

(57) ABSTRACT

A radio communication device (100) for use in a public safety vehicle is provided with a user interface that combines tactile landmarks in the form of global tactile landmarks and local tactile landmarks along with affordances to orient a user's hand and fingers in conjunction with a sequential task flow interface) for mission critical tasks. Communication device (100) comprises a housing (102) having mission critical controls (116) comprising a pursuit dial (122) mounted on a circular platform (206) with siren controls (124) and light controls (126) grouped on either side of the platform. The mission critical controls (116) are laid out in a manner that provides a sequential user flow across escalating urgency. Ridges (208, 210), chamfered edges (402, 404) and edge reliefs (502) provide further affordances so that a user can intuitively position hand and fingers to locate various controls without having to visually focus on the communication device, thus allowing the user to focus on the current mission.

20 Claims, 5 Drawing Sheets

OTHER PUBLICATIONS

International Search Report and Written Opinion for International Application No. PCT/US2009/057384, ISA/KR, issued on Apr. 21, 2010.

International Preliminary Report on Patentability for International Application No. PCT/US2009/057384, issued on May 17, 2011.
Notice of Allowance mailed Aug. 25, 2009 in U.S. Appl. No. 29/327,961, Kaner, et al., filed Nov. 15, 2008.

* cited by examiner

USER INTERFACE FOR A VEHICLE INSTALLED COMMUNICATION DEVICE

FIELD OF THE INVENTION

The invention generally relates to communication devices and more particularly to a user interface for a public safety communication device installed within a vehicle.

BACKGROUND OF THE INVENTION

Vehicle installed radio communication devices have been used in the public safety environment for many years. During mission critical tasks, public safety officials, such as police officers, firefighters, and paramedics, to name a few, need to focus over their surrounding environment in conjunction with operating the communication device. Existing in-vehicle communication devices are often complex and equipped with numerous controls that make non-visual interaction difficult. Hence, a user's cognitive resources are challenged between focusing on the current mission and operating the controls of the device.

Accordingly, it would be highly desirable to have an in-vehicle public safety communication device that overcomes the aforementioned issues.

SUMMARY OF THE INVENTION

Briefly, there is provided herein, in accordance with various various embodiments of the invention, an in-vehicle communication device comprising a housing having a plurality of surfaces upon which global tactile landmarks are laid out for locating functional groups of controls on the communication device. The functional groups of controls may comprise siren and light controls, display controls, pursuit dial, and radio controls. Local tactile identifiers are provided for identifying individual controls within the functional groups. Affordances orient a user's hand and fingers on the housing. A sequential task flow is applied for predetermined mission critical tasks.

BRIEF DESCRIPTION OF THE FIGURES

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
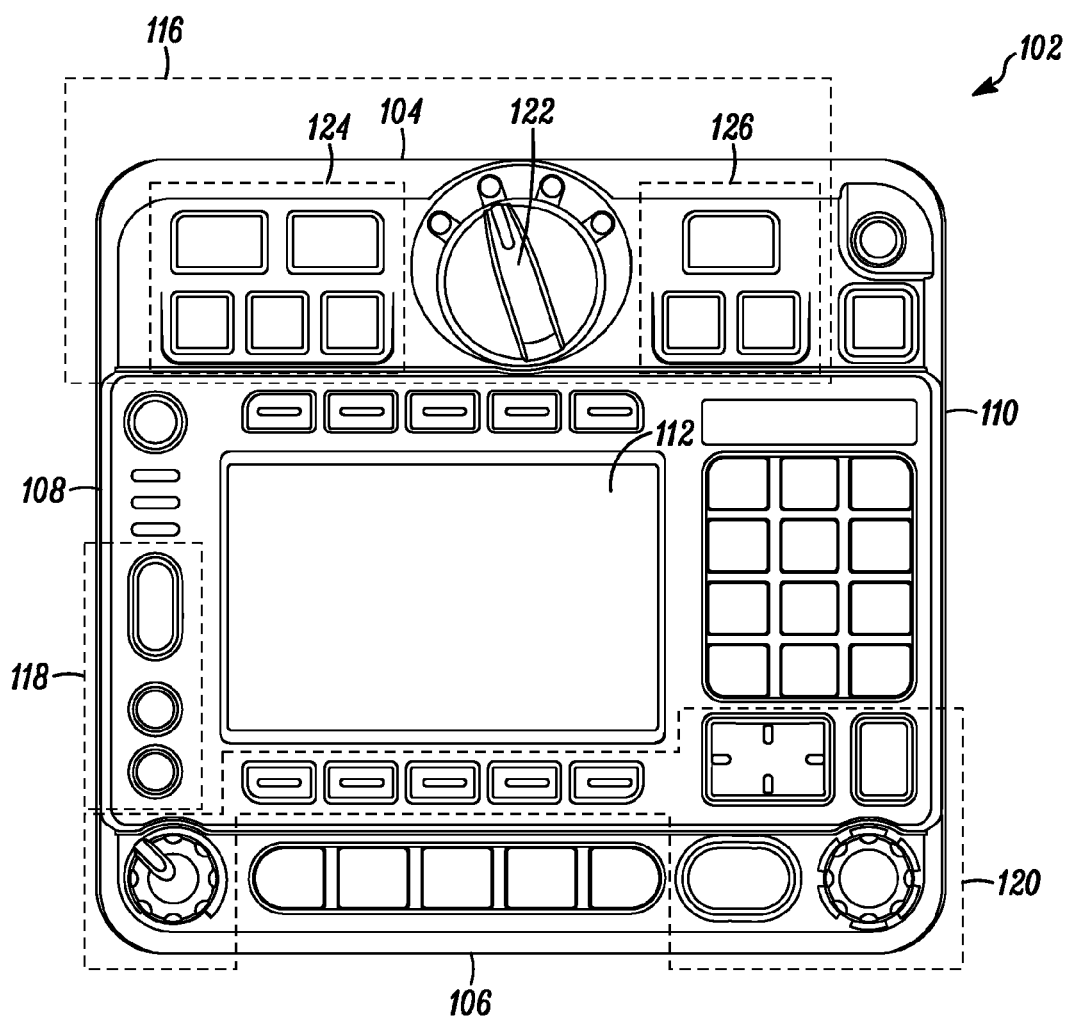
FIG. 1 is an overall layout and functional grouping of an in-vehicle radio communication device formed in accordance with the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE INVENTION

Before describing in detail embodiments that are in accordance with the present invention, it should be observed that the embodiments reside primarily in apparatus components related to a user interface for an in-vehicle radio communication device for use in the public safety environment. The user interface promotes user safety by being operable with little or no visual focus by the user thereby allowing the user to focus on the current task.

Accordingly, the apparatus components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

In the description herein, numerous specific examples are given to provide a thorough understanding of various embodiments of the invention. The examples are included for illustrative purpose only and are not intended to be exhaustive or to limit the invention in any way. It should be noted that various equivalent modifications are possible within the spirit and scope of the present invention. One skilled in the relevant art will recognize, however, that an embodiment of the invention can be practiced with or without the apparatuses, systems, assemblies, methods, components mentioned in the description.

FIGS. 1-5 show a communication device 100 formed in accordance with the present invention for use within a public safety vehicle, such as a police car, ambulance or the like. Communication device 100 provides a user interface which permits users, such as police officers and firefighters, to operate the device with little or no visual attention, allowing the user to concentrate on the environment of the current mission or task. Controls for two-way radio, lights, siren, and display are all laid out using an optimized user interface for in-vehicle access. As such, communication device 100 will also be referred to as an in-vehicle public safety communication device. In accordance with the present invention, a tactile landmark system is provided that comprises functional grouping, global landmarks, local landmarks, and affordances to orient hand and fingers, and a sequential task flow for predetermined mission critical tasks. For the purposes of this application, affordance refers to an object's sensory characteristics that intuitively imply its functionality and use to an individual.

FIG. 1 shows an overall layout with functional groupings for the user interface of the communication device 100 formed in accordance with the present invention. Communication device 100 comprises a housing 102 having top edge 104, bottom edge 106, first and second side surfaces 108, 110, front surface 112 and back surface 114 (designator 114 is shown in later views). The various aspects of the user interface for the communication device 100 including functional groupings, global landmarks, local landmarks and affordances are discussed in progression throughout the figures.

FIG. 1 shows controls associated with main public safety features clustered into functional groups and laid out in an optimized manner. All controls for certain features have been grouped together. In accordance with the present invention, the overall layout comprises groupings of siren and light controls 116, display controls 118 and radio controls 120. The siren and light controls 116 are grouped together as a functional group as these are considered mission critical controls. The mission critical controls are easily located on the front surface 112, towards the top of the housing 102. From this reference point, the display controls 118 are situated on the front surface within the middle of the housing, and the radio controls 120 are located towards the bottom of the housing. These three functional groupings and placement of the groupings on the front housing surface 112 provide a user friendly layout for locating the communication device's main functions. These functional groups 116, 118, 120 can be located using global tactile landmarks on the product housing 102 as will be discussed in subsequent views. Once a particular functional group has been located, the individual controls within the group can be located by local tactile identifiers on or next to the individual controls.

The functional grouping of siren and light controls 116 comprises a pursuit dial 122, siren controls 124 grouped to the left of the pursuit dial 122 on the front surface 112, and light controls 126 grouped to the right of the pursuit dial 122. This configuration of functional grouping 116 facilitates sequential flow of operation and will be described in further detail later.

Figure 2:
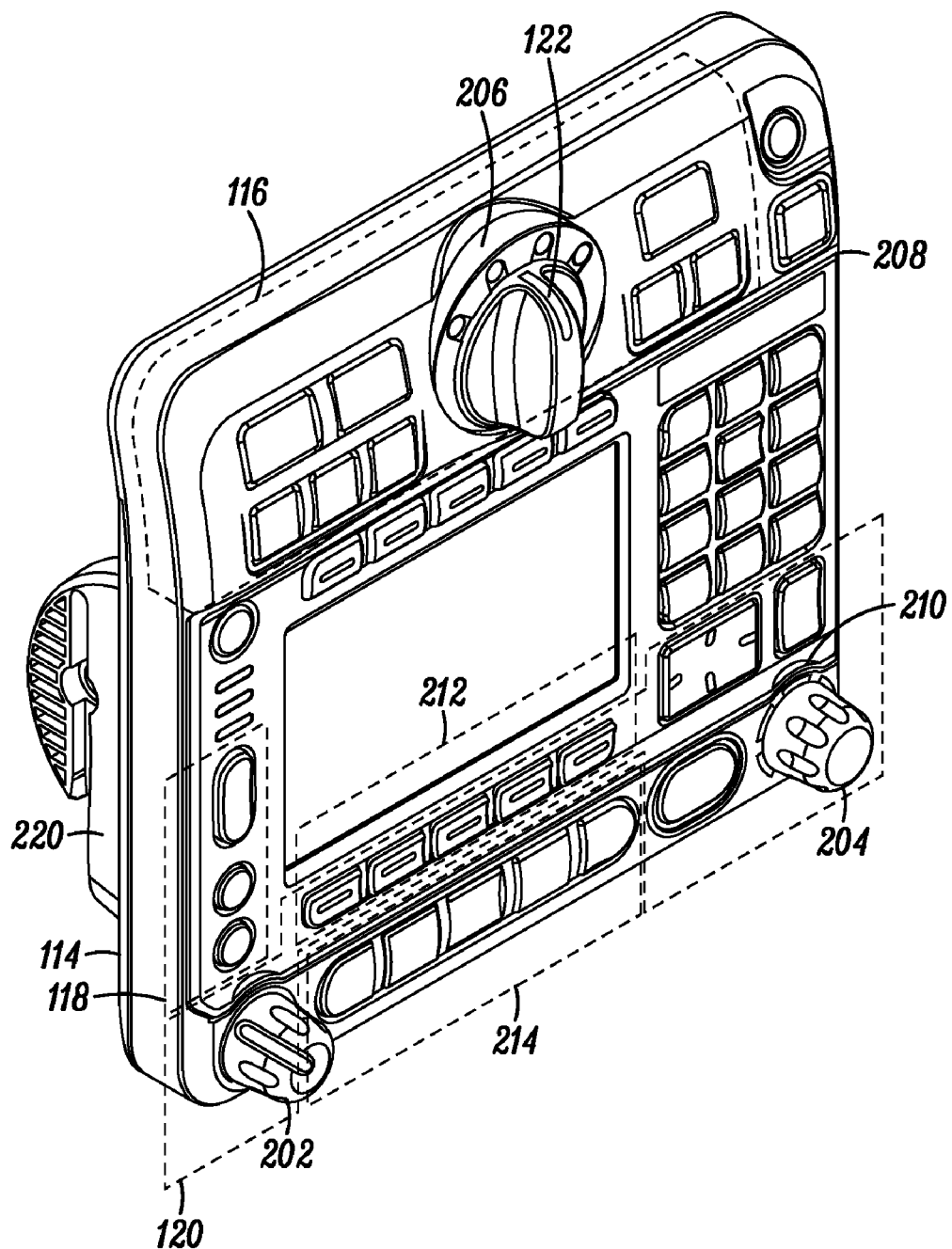
FIG. 2 shows global landmarks of the in-vehicle radio communication device of FIG. 1 formed in accordance with the present invention.

FIG. 2 shows a perspective view of communication device 100 with mounting brackets 220 extending from the back surface 114 for mounting the device within a vehicle. FIG. 2 shows global landmarks 200 of the communication device of FIG. 1 formed in accordance with the present invention. The global landmarks comprise pursuit dial 122, rotary volume control 202, and channel knob 204. These global landmarks 122, 202, 204 of communication device 100 are placed in prominent locations with pursuit dial 202 being located on the top middle of the housing 102, volume control 202 being on the lower left corner of the housing, channel control 204 on the lower right corner of the housing. The positioning of these three controls pursuit dial 122, volume control 202, channel control 204 forms a triangular shape that facilitates location by the user.

To create prominence of the pursuit dial 122 as a global landmark, a circular platform 206 is formed as part of the housing 102 on the front surface 112 proximate to the top edge 104. The circular platform 206 extends off of the top edge 104 of the housing 102 sufficiently enough to allow the top portion of the dial 122 to be sensed as a user touches or slides fingertips along the top edge 104 of the device thereby orienting the user to the top center of the product.

Two horizontal ridges 208, 210 provide global landmarks separating siren/light controls 116, display controls 118 and radio controls 120. First horizontal ridge 208 separates the top siren & light controls 116 from the display controls 118. Second ridge 210 separates radio menu buttons 212 from programmable buttons 214.

The circular platform 206 providing prominence for pursuit dial 122, the ridges 202, 204 separating functional groupings, and the location of pursuit, dial 122, volume control 202 and channel control 204 at outer extremities of the housing 102 provide global landmarks with which a user can orient hand and fingers without having to look at the device.

Figure 3:
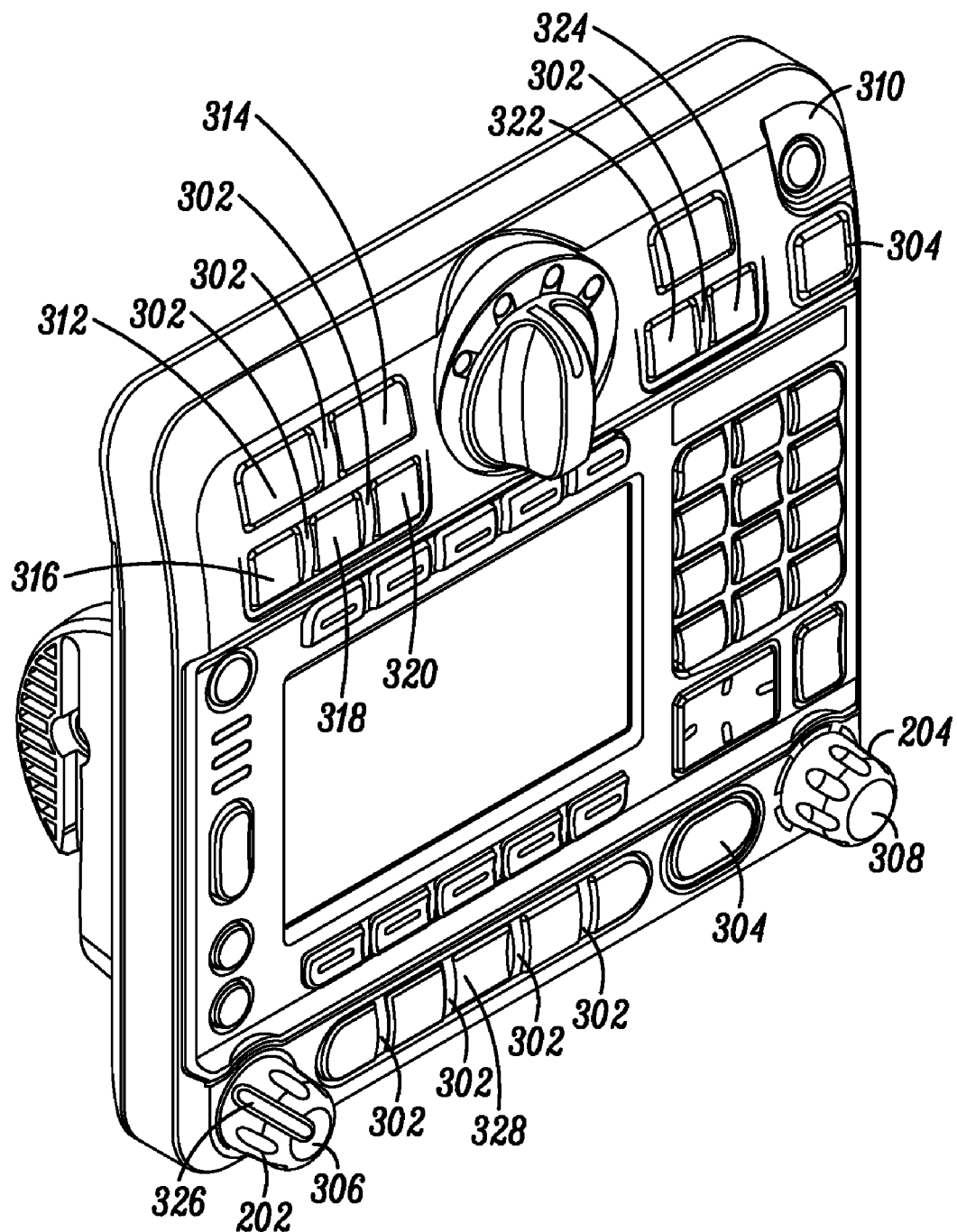
FIG. 3 shows local landmarks of the in-vehicle radio communication device of FIG. 1 formed in accordance with the present invention.

FIG. 3 shows local landmarks of radio communication device of FIG. 1 formed in accordance with the present invention. Local landmarks include elevated ridges 302 formed in housing 102 between adjacent and functionally related controls. In this embodiment, the elevated ridges 302 are located between airhorn and manual horn buttons 312, 314; between siren type controls 316, 318, 320; and between left and right alley lights 322, 324. Examples of the siren types might include "Wail" 316, "Yelp" 318 and "Pierce" or "Hi-Lo" 320. For stand-alone controls, an elevated ridge surrounding the entire button is used 304. Different top surfaces are used for the volume knob 202 (convex surface 306) and channel knob 204 (concave surface 308). Local landmarks further include a recessed corner 310 for emergency button 330. Other local landmarks include a tactile pointer 326 on the volume control 202. The middle button within a functional group of buttons also differs in profile or shape (concave vs. convex), such as seen at center buttons 328.

Figure 4:
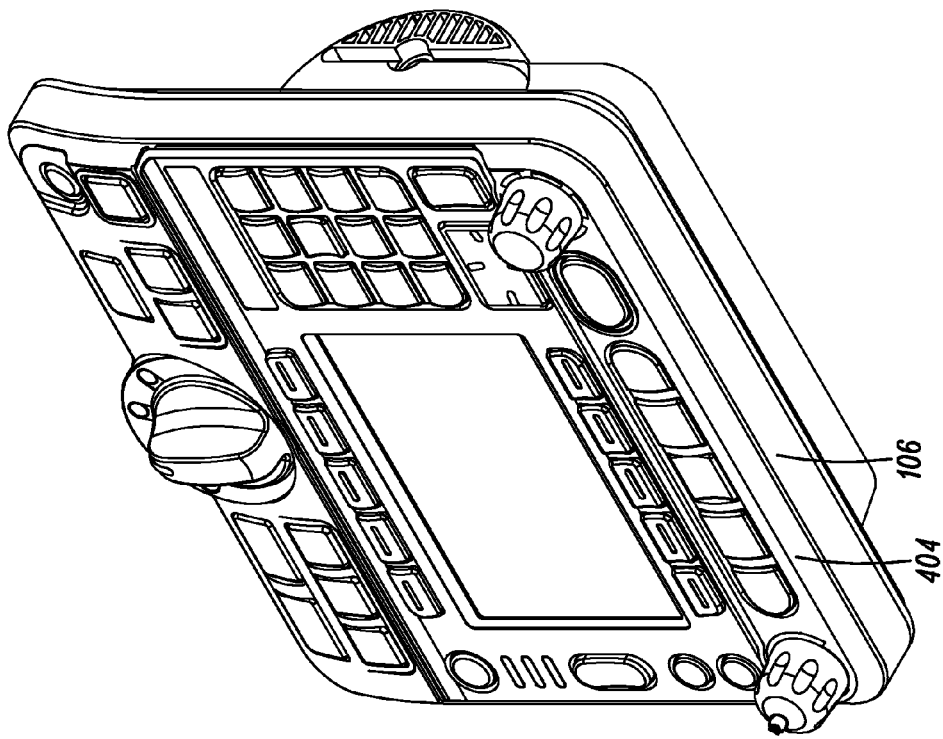
FIG. 4 shows affordances for hand and fingers in the form of chamfered edge and platform features of the in-vehicle radio communication device of FIG. 1 formed in accordance with the present invention.
Figure 4:
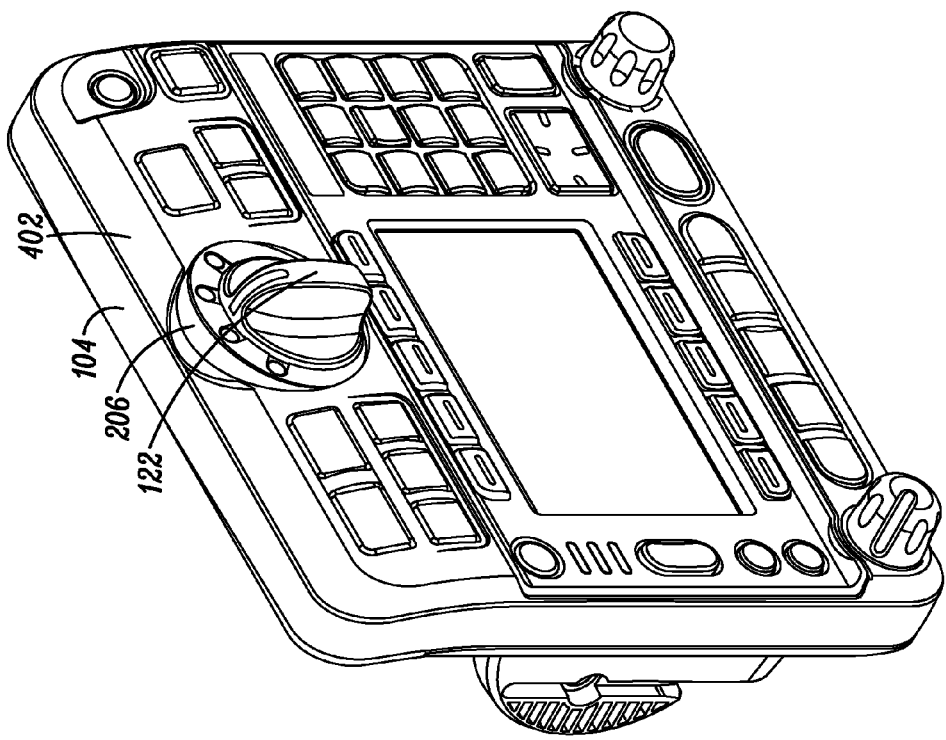

FIG. 4 shows affordances for hand and fingers in the form of chamfered edge and platform features of the communication device of FIG. 1 formed in accordance with the present invention. A first chamfered edge 402 extends from front surface 112 and slopes towards top edge 104 forming a rounded upper surface along the housing 102. A second chamfered edge 404 provides a sharper and shorter slope joining front surface 112 to bottom edge 106. The use of two different chamfered edges allows a user to feel the housing 102 and recognize immediately the outline of the upper and lower surfaces of the communication device. Additionally, the platform feature 206 provides a curved surface extending from the chamfered edge 402 providing an indication affordance for hand and finger placement for mission critical controls. The gradual sloping of chamfered edge 402 further enhances affordance characteristics of the mission critical controls and intuitive sensory adaptation by the user.

Figure 5:
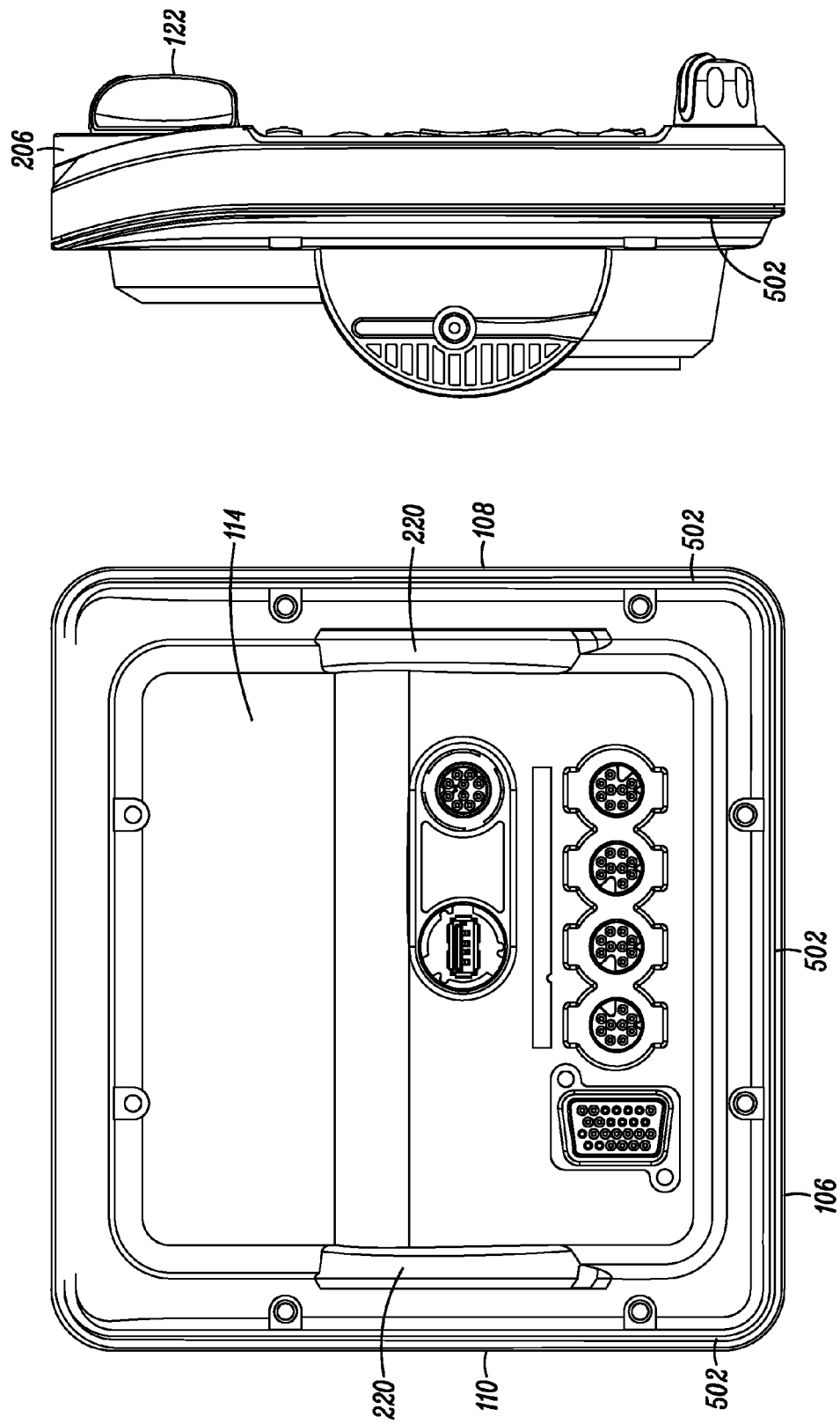
FIG. 5 shows affordances for hand and fingers in the form of edge reliefs of the in-vehicle radio communication device of FIG. 1 formed in accordance with the present invention.

FIG. 5 shows affordance for hand and fingers in the form of edge reliefs of the communication device of FIG. 1 formed in accordance with the present invention. Edge reliefs 502, formed as back housing undercuts, are located underneath the side surfaces 108, 110 as well as underneath bottom edge 106.

The tactile landmarks and affordances facilitate the ease with which a user locates controls on communication device 100 illustrated in FIGS. 1-5. The communication device 100 further provides an additional sequential task flow user interface for mission critical tasks. As discussed previously, the mission critical controls of siren and light controls 116 are grouped together as an easy to locate group that can be operated with minimal visual attention, allowing the user to stay focused on the mission. In accordance with the sequential task flow interface, the siren type controls 124 are grouped to the left of the pursuit dial 122 allowing the user to switch the siren type/sound in escalating urgency from left to right when attention is needed. The circular platform 206 is formed at the center such that the pursuit dial 122 remains substantially straight and flat in alignment with the remainder of the front surface 112.

In furtherance of providing a sequential user task flow interface, the pursuit dial 122 is formed as a 4-position dial that controls siren and light setting combinations. Dial 122 positions are programmed for setting of escalating urgency:

| | |
|---|---|
| Position 0 | Off |
| Position 1 | Basic lightbar lights |
| Position 2 | All ligtbar lights |
| Position 3 | All lightbar lights with sirens |

The light controls 126 are grouped to the right side of the pursuit dial 122 with a triangular layout that corresponds to light position which facilitates the user switching the appropriate light on without looking at the controls. The top of the triangular layout provides for lights straight ahead, the bottom left of the triangular layout provides left side alley lights and the bottom right of the triangular layout provides right side alley lights. The incorporation of elevated ridges with 306 between the left side and right side alley light controls further facilitates sensory perception of the light control functionality. The siren control grouping 124 and light control grouping 126 are gradually sloped on the left and right sides of the pursuit dial 122. Again, the elevated ridges 302 between adjacent siren controls facilitate the user's sensory interpretation as the user's finger's move from left to right. Thus, a user can locate and manipulate the siren and light controls through touch and feel without have to visually focus on the actual controls during mission critical tasks.

Accordingly, there has been provided a communication device for use in the public safety environment with an improved user interface. The in-vehicle communication device provides a user interface that combines tactile landmarks in the form of global tactile landmarks, local tactile landmarks, and affordances to orient a user's hand and fingers without have the user visually focus on the device. Additionally, the communication device provides a sequential task flow user interface that facilitates the use of control for mission critical tasks.

Those skilled in the art will appreciate that the above recognized advantages and other advantages described herein are merely exemplary and are not meant to be a complete rendering of all of the advantages of the various embodiments of the present invention.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The present invention is defined solely by the appended claims including any amendments made during the pendency of this application and all equivalents of those claims as issued.

What is claimed is:

1. An in-vehicle communication device, comprising:
   a housing having top edge, bottom edge, first and second side surfaces, a front surface and a back surface;
   global tactile landmarks laid out on the housing for locating functional groups of controls on the radio communication device, the functional groups of controls comprising siren and light controls, display controls and radio controls;
   local tactile identifiers for identifying individual controls within the functional groups;
   affordances to orient a user's hand and fingers on the housing; and
   a sequential task flow for predetermined mission critical tasks.

2. The vehicular radio communication device of claim 1, wherein the global tactile landmarks comprise:
   a pursuit dial located on the top surface proximate to the top edge of the housing;
   a rotary volume control located on a lower left corner of the housing; and
   a channel control knob located on a lower right corner of the housing.

3. The vehicular radio communication device of claim 2 wherein the pursuit dial is positioned on a circular platform extending off of the top surface along the top edge of the housing thereby providing sensory and orientation of the user to the top center of the product.

4. The vehicular radio communication device of claim 3, further comprising:
   first and second horizontal ridges formed on the top surface of the housing;
   wherein the first horizontal ridge separating the top siren and light controls from the display controls; and
   the second horizontal ridge separating radio menu buttons from programmable buttons.

5. The vehicular radio communication device of claim 4, wherein the local landmarks comprise:
   an elevated ridge formed within the housing between adjacent controls within a functional grouping of controls; and
   a surrounding ridge formed around non-adjacent controls.

6. The vehicular radio communication device of claim 5, wherein the local landmarks comprise:
   a recessed corner for an emergency button.

7. The vehicular radio communication device of claim 2, further comprising:
   first and second chamfered edges formed along top and bottom edges of the housing;
   a circular platform formed around the pursuit dial;
   edge reliefs formed of back housing undercuts located underneath the first and second side surfaces as well as underneath the bottom edge of the housing; and
   the first and second chamfered edges, circular platform and edge reliefs providing affordances for orienting a user's hand and fingers.

8. The vehicular radio communication device of claim 7, wherein the pursuit dial controls both siren and light settings.

9. The vehicular radio communication device of claim 8, wherein the pursuit dial has four positions going from left to right providing an off position, a basic lightbar position, an all lightbar position, and an all lightbar with sirens position.

10. The vehicular radio communication device of claim 1, wherein the functional grouping of siren and light controls comprises:
   a pursuit dial;
   siren controls grouped to the left of the pursuit dial on the front surface; and
   light controls grouped to the right of the pursuit dial.

11. The vehicular radio communication device of claim 10, further comprising:
elevated ridges located between siren controls to facilitate the user's sensory interpretation of the siren controls as the user's finger's move from left to right.

12. The vehicular radio communication device of claim 11, wherein the light controls are grouped to the right side of the pursuit dial with a triangular layout that corresponds to light position, the top of the triangular layout providing for lights straight ahead, the bottom left of the triangular layout providing left side alley lights and the bottom right of the triangular layout providing right side alley lights.

13. The vehicular radio communication device of claim 12, wherein the elevated ridges are incorporated between the left side and right side alley light controls to further facilitate sensory perception of the light controls.

14. The vehicular radio communication device of claim 13, further comprising:
a rotary volume control located on a lower left corner of the housing; and
a channel control knob located on a lower right corner of the housing.

15. The vehicular radio communication device of claim 14, wherein the siren control grouping and light control grouping are gradually sloped on the left and right sides of the pursuit dial toward the top edge of the housing thereby enabling a user to locate and manipulate the siren and light controls without have to visually focus on the siren and light controls.

16. The vehicular radio communication device of claim 15, further comprising:
an emergency control on an upper right recessed corner of the housing.

17. An in-vehicle public safety communication device, comprising:
a housing having top edge, bottom edge, first and second side surfaces, a front surface and a back surface;
mission critical controls comprising:
a pursuit dial located on the top surface at the top edge of the housing;
siren controls located on one side pursuit dial;
light controls located on the other side of the pursuit dial; and
wherein the pursuit dial controls both siren and light settings via a sequential task flow including: off, predetermined light setting and predetermined light setting with siren.

18. The mobile radio of claim 17, wherein the pursuit dial is seated on
a circular platform extending from the top surface of the housing.

19. The mobile radio of claim 18, further comprising:
a volume control and channel control located on separate lower corners of the housing;
display controls located between the mission critical controls and the volume and channel controls on the front surface of the housing.

20. The mobile radio of claim 19, further comprising:
edge reliefs formed within the housing under the first and second side surfaces and beneath to bottom edge;
chamfered edges formed along the top and bottom surfaces of the housing; and
a first horizontal ridge formed in the housing to separate the volume and channel controls from the display controls; and
a second horizontal ridge separating the mission critical controls from the display controls.

* * * * *

UNITED STATES PATENT AND TRADEMARK OFFICE
CERTIFICATE OF CORRECTION

PATENT NO.       : 8,185,268 B2
APPLICATION NO.  : 12/271873
DATED            : May 22, 2012
INVENTOR(S)      : Jarvinen et al.

It is certified that error appears in the above-identified patent and that said Letters Patent is hereby corrected as shown below:

On the Title page:

Item (57), under "ABSTRACT", in Column 2, Line 6, delete "interface)" and insert -- interface --, therefor.

In the Specifications:

In Column 1, Lines 29-30, delete "various various" and insert -- various --, therefor.

In Column 5, in Table, in Line 3, delete "ligtbar" and insert -- lightbar --, therefor.

Signed and Sealed this
First Day of January, 2013

David J. Kappos
*Director of the United States Patent and Trademark Office*